Sept. 3, 1929.                C. C. CHAPIN                1,726,806
PROCESS AND APPARATUS FOR INCREASING THE STRENGTH OF RADIOSIGNALS
Filed Oct. 25, 1926
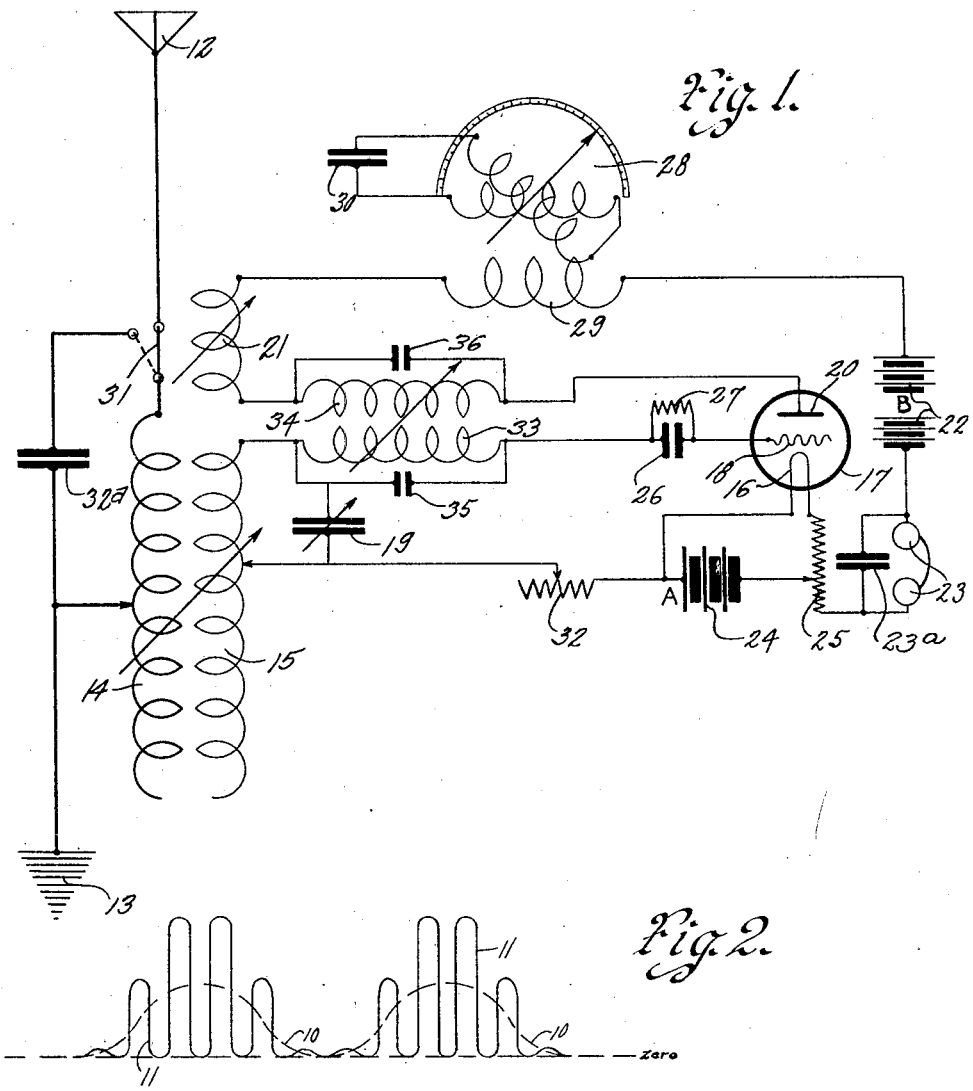
Inventor
Chauncey C. Chapin, Dec.
by Bair & Freeman Attorneys
Witness Patented Sept. 3, 1929.

1,726,806

UNITED STATES PATENT OFFICE.

CHAUNCEY C. CHAPIN, DECEASED, LATE OF STERLING, COLORADO, BY THE COLORADO NATIONAL BANK, EXECUTOR, OF DENVER, COLORADO.

PROCESS AND APPARATUS FOR INCREASING THE STRENGTH OF RADIOSIGNALS.

Application filed October 25, 1926. Serial No. 144,137.

The object of the invention is to provide a process for increasing the strength of radio signals by superposing a harmonic vibration or frequency on the signal wave of the grid circuit.

A further object is to provide an apparatus for causing such harmonic vibration.

Still a further object is to provide such apparatus with means for varying the frequency of the harmonic vibrations in the grid circuit and with other means for varying the amplitude thereof.

Still another object is to provide a resistance in the grid circuit and an inductive coupling between the grid and plate circuits for accomplishing the results of the process.

With these and other objects in view, the invention consists in the construction, arrangement and combination of the various parts of the device, whereby the objects contemplated are attained, as hereinafter more fully set forth, pointed out in the claim, and illustrated in the accompanying drawings.

The process and apparatus are based upon the fundamental principle that "the average of the square of a variable quantity is always greater than the square of the average". The apparatus is diagrammatically illustrated in Figure 1 of the accompanying drawing in connection with a regenerative receiving set employing a triode detector tube; and Figure 2 illustrates diagrammatically the superposed harmonic wave and the ordinary signal wave on which it is superposed.

It is a known law of radio that the detecting action of a triode tube is proportional to the square of the intensity of the impressed signal. It is therefore evident and by experiment is found that if the signal is made to vary above and below its average value during its period of existence, the detecting action of the tube will be increased. This applies to any receiving circuit in which the tube detects by reason of the change in intensity of the incoming signal. In reception, the principle of the superposition of the harmonic frequency on the signal to cause it to vary above and below the position of normal grid balance produces the result of increasing the strength of the signal by reason of the fundamental principle hereinbefore stated.

This principle can also be applied to transmission and a harmonic frequency if strongly enough impressed in transmitting, eliminates the necessity of superposition of the harmonic vibrations at the receiving station to produce harmonic grid vibrations in the receiving grid circuit.

Where there is a superposition of harmonic frequency at the sending station, a superposition of a harmonic frequency at the receiving station on that already received, gives a still greater increase in the strength of the audible signal. Even though no harmonic frequency is impressed in transmitting such impression at the receiving set produces a great increase in sensitivity.

In Figure 2, the dotted line 10 indicates the potential of an ordinary curve for an incoming signal when transmitted by the ordinary sending station and as received by the grid of a detector tube without a superposition of harmonic frequency. The curve for the superposition of a harmonic variation or frequency is indicated by the line 11 and it will be noted that this line varies from zero to twice the amplitude of the line 10. This is the greatest possible variation and less variation will be obtained by apparatus to be later described. For instance, the superposed frequency may vary from zero to twice the amplitude of the unvaried wave or from one-half to one and one-half the amplitude and so on. Any variation would necessarily have the same increase as decrease from the amplitude of the ordinary wave and its line curve would register equidistant thereabove and therebelow. The apparatus whereby the signal is caused to vary or in other words, a harmonic frequency is superposed on the signal wave, and the means for varying the harmonic frequency as well as the means for varying its amplitude will be later described.

In the receiving circuit illustrated in Figure 1, an antenna 12, ground 13 and primary coil 14 constitute the primary circuit. The secondary circuit comprises a secondary coil 15 (inductively connected to the coil 14), the filament 16 and grid 18 of a triode detecting tube 17, the usual grid condenser 26, the grid leak 27 and a condenser 19 for tuning the secondary circuit.

The plate circuit includes the plate 20 of the triode tube 17, the tickler coil 21 (inductively coupled to the secondary coil 15), "B" battery 22 and earphones 23 shunted by a radio by-pass condenser 23ª.

These three circuits are of the common type as found in a simple regenerative set and the hookup is the same. It is understood that an audio amplifier may be interposed between the plate circuit and the earphones. A loud speaker may be substituted for the earphones and radio frequency amplification may be employed if found desirable.

An "A" battery 24 provides current for heating the filament 16. This current is controlled by a rheostat 25.

For tuning the set to any desired wave length without causing annoyance to adjacent receiving sets due to the reradiation common to regenerative sets, a wave trap 28 is provided which is calibrated as to wave length. The wave trap 28 is of the variometer type and is inductively coupled to the plate circuit by reason of the coil 29 in the plate circuit. A condenser 30 is included as a part of the wave trap 28.

In tuning, the switch 31 is moved to the dotted line position for disconnecting the receiving set from the antenna 12 and for shunting the condenser 32$^a$ across the primary coil 14. The wave trap is then set to a desired wave length and the set tuned in oscillatory condition after which the set is deresonated by depressing the filament current and the switch 31 is then returned to full line position for reception of signals absorbed by the antenna.

For producing superposed harmonic vibrations in the grid circuit and for controlling the frequency thereof, there is provided the following described mechanism.

Ordinarily there is a point at which the grid balances and the grid condenser 26 absorbs the grid current caused by a potential drop in the circuit.

When its point of maximum absorption is attained, the grid condenser starts discharging. This causes an oscillation in the grid circuit which is controlled as to frequency, in my device, by a resistance 32 of the adjustable type. The resistance 32 is interposed in the grid circuit between the grid condenser 26 and the filament 16. The resistance 32 does not alter the action of the grid condenser but it does determine the rate at which the grid condenser charges and discharges and thus results in the superposition of harmonic frequency on the normal frequency of the signal wave in the grid circuit. On account of this function the resistance 32 is referred to as harmonic resistance. When more of the resistance 32 is cut into the circuit, the frequency of the superposed variations is increased because the resistance 32 causes a potential drop in the grid circuit which permits only a small charge to accumulate in the grid condenser. The grid condenser consequently discharges quicker and oftener.

Less resistance on the other hand delays the discharge because a large charge is allowed to accumulate in the grid condenser.

It is found that the sensitivity of the grid can be controlled by a harmonic coupling comprising a coil 33 inductively coupled to a coil 34 in the plate circuit. The coil 33 is adjustable relative to the coil 34 for varying the inductive coupling between the grid and plate circuits. Radio frequency by-pass condensers 35 and 36 shunt the coils 33 and 34 so that radio frequency waves can pass through the grid and plate circuits without having to go through the coils 33 and 34.

This harmonic coupling controls the impressed harmonic frequency as to the amplitude of it and causes the same to vary more or less above and below the incoming signal wave. Adjustment of the coupling between the coils 33 and 34, increases and balances the sensitivity already obtained by the harmonic resistance 32.

From the foregoing it will be seen that there is provided in a receiving circuit, a process of reception by causing harmonic frequency to be superposed on the signal wave in the grid circuit and that apparatus is provided for controlling the frequency and the amount of such superposed variation.

There is here set forth in detail the sequence of functions of the harmonic resistance and the harmonic coupler, combined with the radio apparatus as explained.

Assume some normal amplitude of grid voltage oscillation; departure of said amplitude from normal occurs with my apparatus. The interposition of the harmonic resistance causes a variation of said amplitude above normal. The restoring force is negative grid potential. This depresses the plate current and decreases regenerative effect thus decreasing the departure and tends to restore the grid potential to normal.

The restoring force lags behind the departure. This restoring force or negative grid potential equals the leak grid current times leak resistance but leak current equals grid current minus condenser current. That is, leak current does not equal grid current until the condenser is full. Thus the condenser delays the action of the restoring force. The energy of the condenser has an effect like inertia. It tends to perpetuate existing potential across the leak. The energy of the oscillating tuning system also acts as inertia to some extent, tending to maintain amplitude and thus grid current.

The essentials of a harmonic motion are a point of normal equilibrium, a restoring force, and a form of inertia, the latter being an energy absorbing element acting to postpone restoration.

Tracing then, the sequence of action in the apparatus there occurs a positive departure from what would otherwise be normal grid balance and increased grid current, rising condenser current and rising leak current (the potential across leak always equals leak current times leak resistance which always equals charge of condenser divided by capacity).

This development continues with increase of restoring force which is negative grid potential acting to depress regeneration until the maximum condenser charge is obtained. When the condenser current is zero, the leak current minus grid current and grid potential equals minus grid or leak current times leak resistance. About this time departure will decrease and the grid current will fall but the condenser charge will maintain the leak current and tend to perpetuate grid potential. Thus when departure is zero the condenser still furnishes current through the leak and induces negative departure. This continues until the condenser charge is minimum, when the leak current equals the grid current and is minimum. This puts minimum potential on the grid which increases the plate current and the regenerative effect. This tends to restore the radio frequency amplitude of the grid to normal (zero departure) but when normal is reached, the condenser still absorbs grid current which presses leak current and thus radiates the action of the restoring force. This permits positive departure and harmonic displacement of grid potential is thus realized.

The checking of the departure by the restoring force affects the harmonic departure from normal grid balance. In the feature of harmonic departure lies an important part of the invention.

For employing the process and apparatus for the superposition of a harmonic frequency in transmission, the same apparatus herein described is interposed in the corresponding circuits of the transmitting set.

Some changes may be made in the construction and arrangement of the various parts of the invention and in the practice of the steps of the process without departing from the real spirit and purpose of the invention, and it is the intention to cover by the claim, any modified forms of structure or use of mechanical equivalents, which may be reasonably included within its scope.

What is claimed is:

A combination with a radio apparatus of means for superposing a harmonic frequency on a signal wave comprising resistance in the grid circuit, and means for controlling the amplitude of the superposed harmonic frequency, said means comprising adjustable induction coils arranged in operative relation in the grid and plate circuits respectively, and by-pass condensers for shunting said coils so that radio frequency waves can pass through the grid and plate circuits without having to pass through said coils.

COLORADO NATIONAL BANK,
*Executor of the Estate of Chauncey C. Chapin, Deceased.*

By HUGH McLEAN,
*Asst. Trust Officer.*